United States Patent [19]

Krylov et al.

[11] 4,212,504
[45] Jul. 15, 1980

[54] BACKING DEVICE FOR A WORKING ROLL OF A ROLL STAND

[76] Inventors: Nikolai I. Krylov, 1 Novokuzminskaya ulitsa, 25, kv. 26, Moscow; Ilya A. Toder, ulitsa Pobedy, 94, korpus 3, kv. 6, Elektrostal Moskovskoi oblasti; Valery A. Tolstykh, Poslannikov pereulok, 11/14, kv. 103, Moscow; Gennady I. Tarabaev, prospekt Juzhny, 3, korpus 4, kv. 74, Elektrostal Moskovskoi oblasti; Igor M. Makeev, Frunzenskaya naberezhnaya, 36, kv. 227, Moscow; Georgy S. Safarov, ulitsa Dzerzhinskogo, 5/8, kv. 12, Belaya Kalitva Rostovskoi oblasti; Alexei V. Birjulev, ulitsa Sverdlova, 50, kv. 24, Belaya Kalitva Rostovskoi oblasti; Anatoly I. Bakanov, ulitsa Dzerzhinskogo, 2/7, kv. 4, Belaya Kalitva Rostovskoi oblasti; Evgeny I. Sofronov, ulitsa Junykh Lenintsev, 105, korpus 1, kv. 35, Moscow, all of U.S.S.R.

[21] Appl. No.: 15,166

[22] Filed: Feb. 26, 1979

[51] Int. Cl.² .......................................... F16C 32/06
[52] U.S. Cl. .......................................... 308/9; 308/22; 308/122; 100/162 R; 100/170
[58] Field of Search .................... 308/9, 15, 22, 122, 308/121; 100/161, 162 R, 170

[56] References Cited

U.S. PATENT DOCUMENTS

| | | | |
|---|---|---|---|
| 3,945,692 | 3/1976 | Tsujiuchi | 308/122 |
| 4,074,624 | 2/1978 | Biörnstad et al. | 100/170 |
| 4,113,324 | 9/1978 | Rohr | 308/122 |

Primary Examiner—Lenard A. Footland
Attorney, Agent, or Firm—Lackenbach, Lilling & Siegel

[57] ABSTRACT

The backing device has a back-up roll placed between the housings of a roll stand and the ends of the roll are mounted in the guide windows of the housings. A hydrostatic bearing has a body which rests on the back-up roll and a shell whose internal surface is spaced by a clearance from the barrel of the back-up roll and is provided with pockets. The back-up roll rests by its ends on a supporting beam which is pressed against it by pressure screws. The bearing shell is urged against the roll barrel by hydraulic cylinders mounted between the supporting beam and the bearing body. The chambers of the hydraulic cylinders are connected through respective conduits and throttles to the pockets on the shell internal surface, and there is at least one pocket for each hydraulic cylinder. The pockets and the respective hydraulic cylinders are connected to a single source of fluid under pressure.

12 Claims, 4 Drawing Figures

BACKING DEVICE FOR A WORKING ROLL OF A ROLL STAND

The present invention relates to rolling-mill engineering, and more particularly to backing devices for working rolls of roll stands.

Such devices are known in the prior art.

For example, let us consider the backing device disclosed in German Pat. No. 2,185,524 Cl. 7a, 29/00.

This device includes a rigid supporting beam located in the housing of the roll stand under the pressure screws, a back-up roll with bearings supporting its ends, and a hydrostatic bearing which supports the barrel of the back-up roll. The bearing has a shell with pockets adapted to receive oil (or some other fluid), and single-acting hydraulic cylinders are placed between the supporting beam and the hydrostatic bearing along the back-up roll.

In the course of rolling, the force of rolling mounts due to the non-uniform heating, variation in thickness and mechanical properties, etc., of the stock being rolled, which results in greater deformations of the roll stand, in bendings of the working rolls and hence in the change of the rolled-stock thickness. To maintain the specified thickness, the oil pressure in the hydraulic cylinders must be changed.

However, it is impossible in this device to regulate automatically the thickness of the rolled stock by counter-bending the working roll.

Also known are the backing devices for working rolls which provide for lower variation in the rolled-stock thickness in a transverse direction, and such devices have back-up rolls with their bearings mounted in a housing and pressure units arranged between the elongated necks of said rolls. These pressure units create a force which bends the rolls in a direction opposite to the bendings caused by the rolling force. The devices of this type are provided with an automatic system for monitoring the rolled-stock thickness, which include gauging, signal-converting and amplifying means, memory devices, etc.

Automatic adjustment of the counter-bending force is based on measurement of the rolled-stock thickness by gauging means, and convertion of a measuring signal into an electric signal which is used to control the operative devices of the regulating system.

This system should be provided with reliable gauging and controlling means, which sometimes proves impracticable. In addition, a long tract for the convertion of a measuring signal into the operative motion creates a time-lag in the system.

Furthermore, the known systems for the automatic maintenance of the rolled-stock thickness are very complex and expensive.

There are also known backing devices for working rolls of roll stands, including a rigid supporting beam mounted in the roll stand housing under the pressure screws, and a back-up roll with bearings on its ends. Also included is a hydrostatic bearing whose body rests on the back-up roll and which has a shell in the form of a hollow semi-cylinder of a variable-rigidity cross section. The internal surface of said shell is spaced by a clearance from the barrel of the back-up roll, and there is a mechanism for the adjustment of said clearance, and a mechanism for the initial setting thereof.

The clearance adjustment mechanism has adjusting screws disposed in the body of the hydrostatic bearing at the sides of the shell in its loaded region, which screws act upon said shell through suitable wedge means.

The clearance setting mechanism has wedges disposed between the body of the hydrostatic bearing and the shell edges.

The above mechanisms and the bearing shell of a special shape enable the backing device to operate with undersized rolls (i.e. worn rolls reworked for restoration). With the roll barrel of smaller diameter, the specified clearance between the roll and the bearing shell is set up with the aid of the clearance setting mechanism by deflecting the shell, which takes the shape corresponding to that of the undersized-roll barrel.

To increase the rigidity of the shell and reduce its deformation under the action of hydrostatic pressure, the number of points of rigid contact between the hydrostatic-bearing body and the shell is increased with the aid of the screws of the clearance adjustment mechanism.

This backing device, however, has several drawbacks.

The setting and in-process adjustment of the required working clearance between the bearing shell and the roll are very difficult and time-consuming, especially with large-size backing devices.

In addition, the aforesaid operation should be carried out with the hydrostatic bearing being loaded, because otherwise it is very difficult to ensure the required clearance between the roll and the bearing shell.

It, therefore, takes a special device for loading the hydrostatic bearing outside the roll stand, or else the required working clearance should be set up on the roll stand with the rolls being loaded. The edges of the shell should be deflected so as to ensure a specified clearance between itself and the associated roll. A wider clearance allows no required pressure to be maintained therein, whereas a smaller clearance tends to result in a metal-to-metal contact between the shell edges and the roll barrel due to a low pressure of oil in this zone.

Furthermore, it is impossible to automatically regulate the rolled-stock profile with regard to changes in rolling force and to control the required pressure between the bearing shell and the roll barrel, which is essential for the proper operation of a hydrostatic bearing.

Whenever the shell is urged against the roll with excessive force, a space emerges between the shell and the hydrostatic-bearing body. When this force is inadequate, the clearance between the shell and the roll becomes wider, which reduces the bearing supporting power and rigidity.

SUMMARY OF THE INVENTION

It is therefore an object of the present invention to provide a backing device for a working roll of a roll stand which allows for the reliable automatic regulation of the rolled-stock thickness, while being as simple in construction as conventional devices.

Another object of the present invention is to provide a backing device for a working roll of a roll stand which ensures the specified roll gap as the rolled stock comes out of the rolls.

Still another object of the invention is to provide a backing device for a working roll of roll stand which makes it possible to maintain a constant clearance between the bearing shell and the barrel of the back-up roll and to reduce the throttling range in operation of the device with undersized rolls.

A further object of the invention is to provide a backing device for a working roll of a roll stand which enables setting the working clearance between the back-up roll and the bearing shell with the required accuracy, and which also allows reducing the throttling range in operation of the device with undersized rolls.

These and other object of the present invention are attained in a backing device for a working roll of a roll stand placed between the housings of the roll stand and mounted in the guide windows thereof where pressure screws are situated. The backing device comprises a back-up roll placed between said housings, and the ends of said roll are mounted in said guide windows. Also included is a hydrostatic bearing with a bearing shell, the body of said bearing resting on said back up roll, and the internal surface of said shell is spaced from the barrel of said back-up roll by a predetermined clearance and has at least one pocket connected through a conduit to a source of fluid under pressure. In addition, there is a supporting beam whose ends are pressed against the back-up roll by said pressure screws. Also, hydraulic cylinders are mounted between said supporting beam and said hydrostatic bearing along the back-up roll and are adapted to act in the process of rolling upon the bearing body for regulating the thickness of the stock being rolled. In accordance with the invention, the backing device has at least one pocket for each hydraulic cylinder, and said pockets and associated cylinders are connected to a single source of fluid under pressure so that the pockets are connected thereto through corresponding conduits and throttles.

In accordance with the invention, a backing device for a working roll of a roll stand allows reliable automatic regulation of the rolled stock thickness while being as simple in design as conventional devices.

The backing device, according to the invention also makes possible the rolling of wide sheets with stringent requirements on the thickness thereof.

It is expedient that a by-pass valve with a control chamber be placed in parallel with the throttle, and that the control chamber of the valve is connected to the conduit between the pocket and the throttle. Such arrangement makes it possible to provide for a constant roll gap as the rolled stock comes out of the rolls.

It is advantageous in operation with undersized rolls that the backing device be provided with a mechanism for adjusting, in the course of rolling, the clearance between the internal surface of the bearing shell and the barrel of the back-up roll, with said mechanism having hydraulic cylinders accommodated in the bearing body so that the moving element of each hydraulic cylinder acts upon the shell, shaped as a hollow semi-cylinder of a variable-rigidity cross section, in its loaded region, and the chamber of each cylinder is connected to its respective conduit between the pocket of the shell and the throttle.

With such device, it is possible to maintain a constant clearance between the bearing shell and the barrel of the back-up roll and also to reduce the throttling range in operation of the device with undersized rolls.

It is preferable that the backing device be provided with a mechanism for the initial setting of the clearance between the internal surface of the bearing shell and the barrel of the back-up roll. Such a mechanism having hydraulic cylinders accommodated in the bearing body so that the pistons thereof act upon the shell edges, and check valves adjoining the hydraulic cylinder's chambers. The check valves have movable spools with ducts for the passage of working fluid to the hydraulic cylinders, whereby the shell edges can be deflected by an extent necessary to form the required clearance between the shell and the roll barrel.

Thus, it is possible to set up an initial working clearance between the roll and the bearing shell with the required accuracy and also to reduce the throttling range in the operation of the backing device with undersized rolls.

BRIEF DESCRIPTION OF THE DRAWINGS

The invention will now be described by way of example and with reference to the accompanying drawings wherein.

DESCRIPTION OF THE PREFERRED EMBODIMENTS

Figure 1:
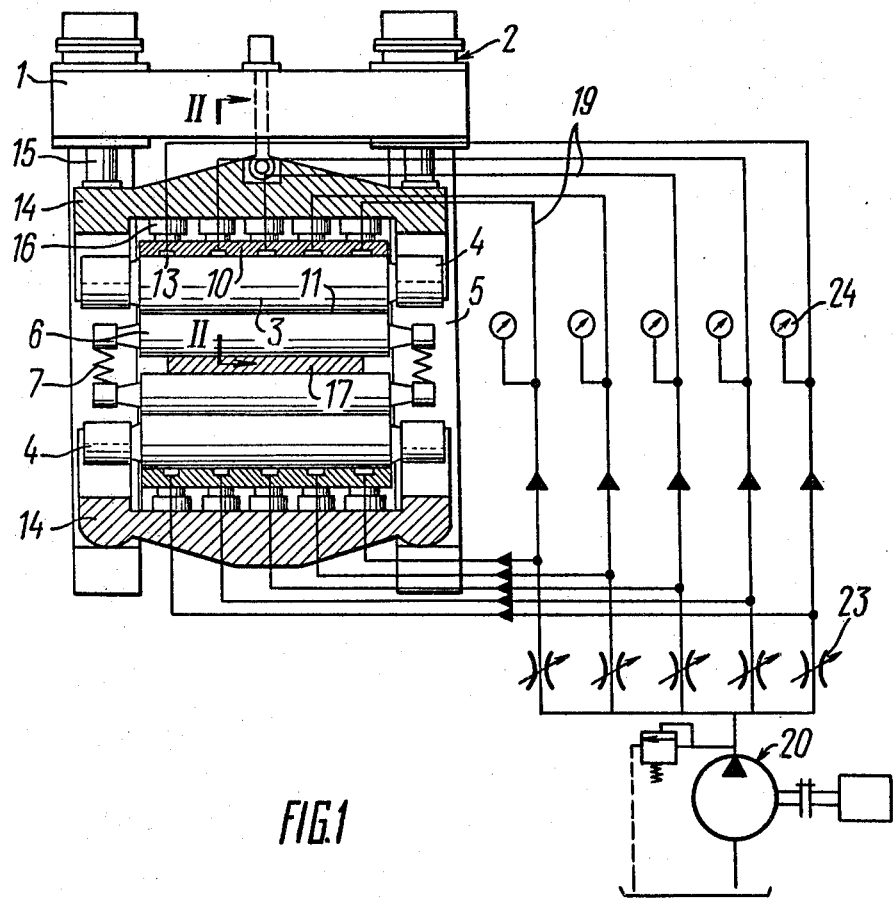
FIG. 1 is a side elevational view, partly in section, of a roll stand of a rolling mill, viewed in the direction of the entrance of the stock to be rolled into the working rolls, and with backing devices of the working rolls.
Figure 2:
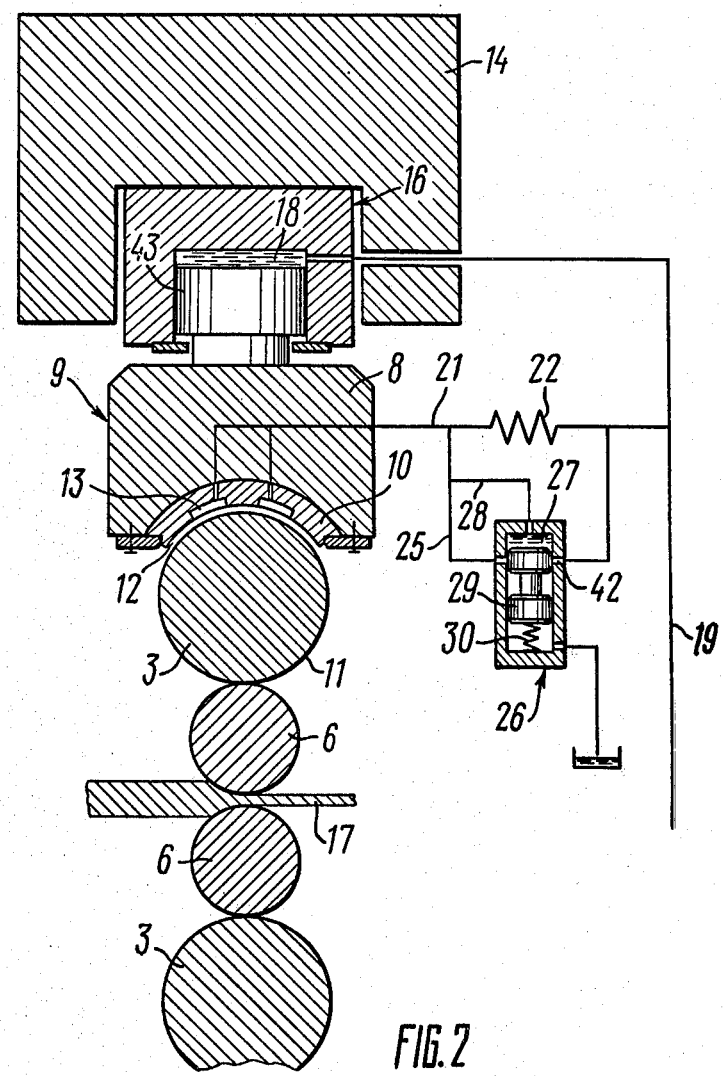
FIG. 2 is a sectional view along the line II—II of FIG. 1.

Referring now to FIGS. 1 and 2 of the drawings, there is illustrated a roll stand of a rolling mill with the backing devices for the working rolls made in accordance with the present invention.

Back-up rolls 3 with bearings 4 on their ends are placed between the housings 1 of a roll stand 2, so that the bearings 4 are mounted in guide windows 5, made on the housings 1, for fixing the rolls 3 in an axial direction.

Working rolls 6 are placed between the back-up rolls 3 and are pressed against these by balancing means 7.

The back-up rolls 3 adjoin hydrostatic bearings 9 with bearing shells 10 whose internal surfaces are spaced from the barrels 11 of the rolls 3 by clearances 12. There are two rows of pockets 13 provided on the internal surface of each bearing shell to receive oil, and the number of the pockets 13 being adopted so as to ensure self-alignment of the rolls 3 in the bearing shell 10.

Supporting beams 14 are placed between the housings 1 so that the ends of the beams are pressed against the back-up rolls 3 by means of pressure screws 15 located in the guide windows 5 of the housings 1.

In order to act upon the body 8 of the bearing 9 for regulating the thickness of the stock being rolled, there are hydraulic cylinders 16 interposed between the supporting beams 14 and the bodies 8 of the bearings 9 and they are arranged along the back-up rolls 3. The hydraulic cylinders 16 are situated at each pair of the pockets 13. The chamber 18 of each cylinder 16 and the associated pockets 13 are connected through a conduit 19 with a single source 20 of fluid under pressure, and the pockets 13 are connected to the conduit 19 through a conduit 21 and a throttle 22.

The source 20 of fluid under pressure is, for instance, a variable-displacement pump which delivers oil under pressure to the hydraulic cylinders 16 and the pockets 13 through the conduits 19, wherein the pressure of oil is maintained by pressure regulators 23 with the aid of pressure gauges 24.

To maintain the required gap between the working rolls 6 as the rolled stock 17 comes therefrom, a by-pass valve 26 is placed in a conduit 25 in parallel with the throttle 22, so that the control chamber 27 of the valve 26 is connected to the conduit 21 through a conduit 28 between the throttle 22 and the pocket 13.

The by-pass valve 26 has a spool 29 and a spring 30 (or some other means for exerting a constant pressure, e.g., an electromagnet).

Figure 3:
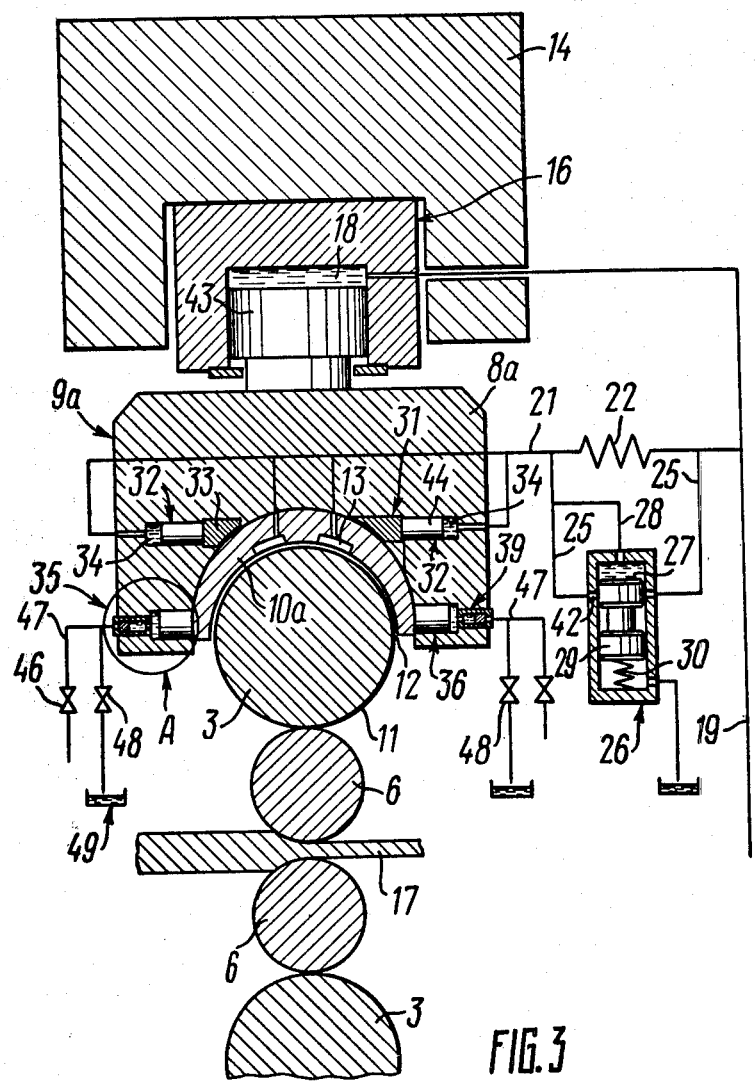
FIG. 3 is a sectional view similar to that of FIG. 2, but showing a backing device with the bearing shell in the form of a half-ring with a variable-rigidity cross section.
Figure 4:
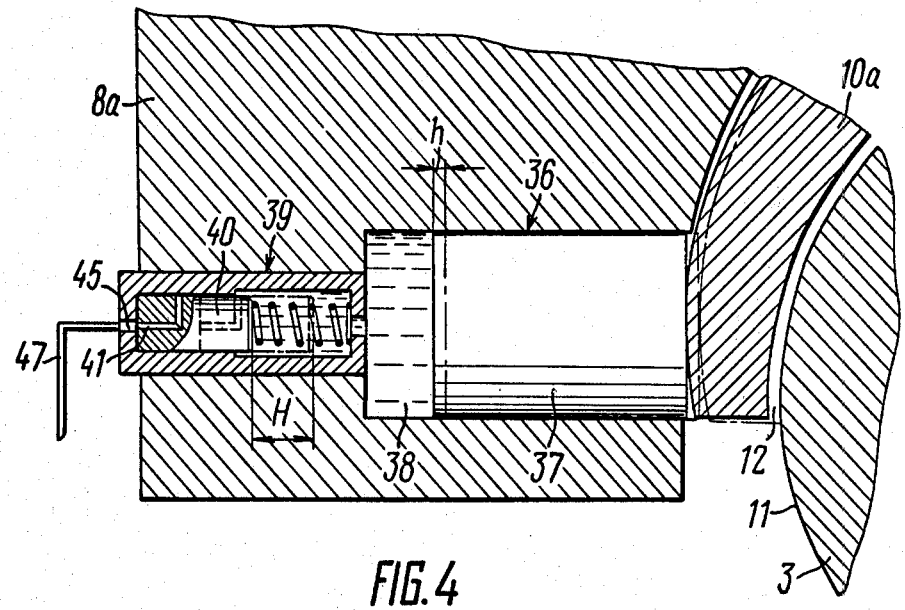
FIG. 4 is an enlarged cross-sectional view of the unit "A" of FIG. 3.

FIGS. 3 and 4 show another embodiment of the backing device wherein the bearing shell is shaped as a hollow semi-cylinder of a variable-rigidity cross section, and wherein mechanisms are provided for adjusting the clearance between the shell internal surface and the roll barrel in the course of rolling and for setting the clearance therebetween prior to rolling.

The mechanism 31 for adjusting the clearance 12 comprises hydraulic cylinders 32 accommodated in the body 8a of a hydrostatic bearing 9a. The movable element 33 of each hydraulic cylinder 32 acts upon the shell 10a of the bearing 9a in its loaded region which is located at an angle of about 30° to the vertical. The chamber 34 of each cylinder 32 is connected to a conduit 21 between the pocket 13 of the shell 10a and the throttle 22.

The mechanism 35 for setting the clearance 12 comprises hydraulic cylinders 36 accommodated in the body 8a of the bearing 9a so that the cylinders' pistons 37 interact with the edges of the shell 10a. The chambers 38 of said cylinders 36 are adjoined by check valves 39 which have movable spools 40 with ducts 41 for the passage of oil to the hydraulic cylinders 36 to cause the latter to deflect the edges of the shell 10a for forming the required clearance 12 between the shell 10a and the barrel 11 of the roll 3.

Under steady operational conditions, the backing device functions as follows.

The pump 20 develops an initial pressure upstream of the pressure regulators 23, which are used to set up in each conduit 19 the required pressure in accordance with the force of rolling. The value of the pressure thus set is checked by means of the pressure gauges 24.

Oil under this pressure is delivered to the hydraulic cylinders 16 and exerts a force on the back-up rolls which is equal to the force of rolling.

The parameters of the hydraulic cylinders 16, pockets 13, and throttles 22 are adopted such that the rate of oil flow through the bearing 9 varying within its operational range provides for liquid friction and for the balance between the force of rolling, the supporting power of the oil film in the clearance 12, and the force developed by the hydraulic cylinders 16. The use of the throttle 22 makes for uniformly increased supporting power of the oil film in the clearance 12 with increased load in the cylinders 16.

In rolling, an increase in the rolling force results in a smaller clearance 12 in the hydrostatic bearing 9 and hence in a higher pressure of oil in the pockets 13. The pressure of oil in the pockets 13 mounts up to the value at which the force developed by the hydraulic cylinders 16 and the supporting power of the oil film become balanced. The system comprising the rolling force—the force of the hydraulic cylinders 16—the supporting power of the oil film stays in equilibrium constantly, and for this reason the load on the bearing 9 hardly ever exceeds its supporting power.

In this way, the force developed by the hydraulic cylinders 16 automatically changes with the change in the pressure of oil in the pockets 13 caused by a changed rolling force.

The force developed by any hydraulic cylinder 16 can be adjusted, i.e. the distrubution of the rolling force along the roll 3 can be changed, by changing the rate of oil flow through a corresponding conduit 19. A change in the flow rate through the throttle 22 causes a corresponding change in its hydraulic resistance by a value of $\delta p$. Hence, the force of the hydraulic cylinder changes by $\Delta P = \delta p \cdot F$, where F is the area of the piston of the cylinder 16.

In the course of rolling, the spool 29 closes oil-passage ports 42 under the action of the oil pressure in the pockets 13 and also in the control chamber 27 of the valve 26, connected therewith. As the rolled stock 17 comes out of the rolls 6, the oil pressure in the pockets 13 and in the chamber 27 drops, the spring 30 shifts the spool 29 thereby opening the passage of oil through the ports 42 to by-pass the throttle 22. This levels the pressure of oil in the cylinders 16 with that in the pockets 13, whose value is at the moment close to zero. The pistons 43 of the hydraulic cylinders 16 stay in the initial position and the gap between the working rolls remains unchanged.

With the backing device using undersized rolls 3, the mechanism 31 for in-process adjustment of the clearance 12 operates as follows and as best shown in FIG. 3.

In rolling, oil is delivered to the pockets 13 of the bearing shells 10a and to the chambers 34 of hydraulic cylinders 32 whose pistons 44 have the areas adopted depending on the specified load on the shell 10a.

As the force of rolling mounts, the clearance 12 between the internal surface of the shell 10a and the barrel 11 of the roll 3 becomes smaller, resistance to the flow of oil through the clearance 12 increases causing an increase in the pressure of oil in the pockets 13. The increase of oil pressure in the pockets 13 is accompanied by a simultaneous increase in oil pressure in the chambers 34 of the hydraulic cylinders 32 whose force resists deformation of the bearing shell 10a.

Therefore, the clearance 12 between the shell 10a and the barrel 11 of the roll 3 and also the position of the roll 3 itself do not change with an increase in the rolling force.

A decrease in the rolling force with the rate of oil flow through the clearance 12 being constant reduces the oil pressure in the pockets 13 and the chambers 34. As this takes place, the clearance 12 does not change, as with the increased rolling force, and the shell 10a retains its cross-sectional shape, i.e. it remains urged against the body 8a of the bearing 9.

In this way, the shape of the shell 10a is automatically adjusted depending on the rolling force.

Prior to rolling with the backing device having the undersized rolls 3, the initial clearance 12 is set up with the use of the mechanism 35.

To do this, the hydrostatic bearing 9a is preloaded with a force which is about half the rolling force. Oil is delivered to the pockets 13 to form an oil film between the friction surfaces—the internal surface of the shell 10a and the surface of the barrel 11 of the back-up roll. Thereafter, oil from a pump (not shown) is directed through an inlet valve 46, conduit 47 and port 45 of the valve 39 into this valve. The spool 40 of the valve is shifted through the length of its stroke "H", and ducts 41 provided therein connect the chambers 38 of the hydraulic cylinders 36 with the inlet ports 45. Under the pressure of oil in the cylinders 36, the edges of the bearing shell 10a are urged inwardly to the barrel 11 of the roll 3 so as to engage it. The force developed by the hydraulic cylinders 36 under the pressure of the oil in the chambers 38 thereof is balanced by the forces of elastic deformation of the shell 10a and by the oil pressure in the clearance 12. The delivery of oil is then stopped, the valve 46 is shut off, and an outlet valve 48 is opened to connect the port 45 to an oil tank 49 for drainage.

The oil pressure in the chamber 38 causes the spool 38 to shift back the distance "H", to displace some amount of oil from the check valve 39, and to close the discharge of oil from the chamber 38. Since the oil pressure in the chamber 38 consequently drops, the edges of the shell 10a displace, under the action of the elastic deformation forces and the pressure in the clearance 12, the pistons 37 of the hydraulic cylinders 36 a distance "h" equal to the width of the clearance 12 which corresponds to the volume of the oil displaced therefrom. The extent of the clearance 12 in hydrostatic bearings is usually some hundredths of a millimeter.

The described procedure ensures the accurate setting of the clearance 12 between the internal surface of the bearing shell 10a and the barrel 11 of the back-up roll 3.

The operation of setting the clearance 12 is carried out periodically before rolling.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A backing device for working roll of a roll stand placed between the housings of said roll stand and mounted in the guide windows of said housings where pressure screws are disposed; said device comprising a back-up roll placed between the housings, the ends of said back-up roll being mounted in the guide windows of said housings; a hydrostatic bearing having a body mounted on said back-up roll and having a shell adapted to adjoin said back-up roll so that the internal surface of said shell is spaced apart from the barrel of said back-up roll and is provided with pockets connected in the course of rolling to a source of fluid under pressure; a supporting beam whose ends are pressed against said back-up roll by said pressure screws; hydraulic cylinders mounted between said supporting beam and said hydrostatic bearing and arranged along said back-up roll so that there is at least one pocket of said bearing shell for each of said hydraulic cylinders, the chambers of said hydraulic cylinders being connected in the course of rolling to the source of fluid under pressure, whereby said hydraulic cylinders act upon the body of said hydrostatic bearing for regulating the thickness of the stock being rolled; conduits for connecting in the course of rolling the pockets of said shells and the chambers of said hydraulic cylinders to a single source of fluid under pressure; and throttles in the conduits that connect the pockets of said shell to the source of fluid under pressure.

2. A backing device as claimed in claim 1, including by-pass valves having control chambers, each of said valves being placed in parallel with each of said throttles, and each of said control chambers being connected to the respective conduit between said throttle and the respective pocket of said bearing shell.

3. A backing device as claimed in claim 1, wherein said shell is an arcurate bearing shell covering a substantial portion of the periphery of said back-up roll.

4. A backing device as claimed in claim 1, wherein each said back-up roll, hydrostatic bearing, shell, supporting beam and hydraulic cylinders are provided on opposite sides of said rolled stock.

5. A backing device as claimed in claim 1, wherein said pockets form a pair of rows on the internal surface of said shell.

6. A backing device for a working roll of a roll stand placed between the housings of said roll stand and mounted in the guide windows thereof where pressure screws are disposed; said device comprising a back-up roll placed between the housings, the ends of said back-up roll being mounted in the guide windows of said housings; a hydrostatic bearing having a body mounted on said back-up roll and having a shell shaped as a hollow semi-cylinder of a variable-rigidity cross section and adapted to adjoin said back-up roll so that the internal surface of said shell is spaced by a clearance from the barrel of said back-up roll and is provided with pockets connected in the course of rolling to a source of fluid under pressure; a supporting beam whose ends are pressed against said back-up roll by said pressure screws; hydraulic cylinders mounted between said supporting beam and said hydrostatic bearing and arranged along said back-up roll so that there is at least one pocket of said bearing shell for each of said hydraulic cylinders, the chambers of said hydraulic cylinders being connected in the course of rolling to a source of fluid under pressure, whereby said hydraulic cylinders act upon the body of said hydrostatic bearing for regulating the thickness of the stock being rolled; conduits for connecting in the course of rolling the pockets of said shell and the chambers of said hydraulic cylinders to a single source of fluid under pressure; and throttles in the conduits that connect the pockets of said bearing shell to the source of fluid under pressure.

7. A backing device as claimed in claim 6, including by-pass valves having control chambers, each of said valves being placed in parallel with each of said throttles, and each of said control chambers being connected to the respective conduit between said throttle and the respective pocket of said bearing shell.

8. A backing device as claimed in claim 6, including a mechanism for in-process adjustment of said clearance between the internal surface of said bearing shell and the barrel of said back-up roll; said mechanism comprising hydraulic cylinders accomodated in the body of said hydrostatic bearing so that the movable element of each of said hydraulic cylinders acts upon said bearing shell, and the chamber of each hydraulic cylinder being connected to the corresponding conduit between said throttle and the respective pocket of said bearing shell.

9. A backing device as claimed in claim 6, including a mechanism for setting said clearance between the internal surface of said bearing shell and the barrel of said back-up roll; said mechanism comprising hydraulic cylinders accommodated within the body of said hydrostatic bearing so that the pistons of said cylinders interact with the edges of said bearing shell, and check valves adjoining the chambers of said cylinders, said check valves being movable spools with ducts for the passage of fluid under pressure to said hydraulic cylinders, whereby said hydraulic cylinders displace the edges of said bearing shell by an amount which ensures the formation of the required clearance between said bearing shell and said roll barrel.

10. A backing device as claimed in claim 6, wherein said shell is an arcurate bearing shell covering a substantial portion of the periphery of said back-up roll.

11. A backing device as claimed in claim 6, wherein each said back-up roll, hydrostatic bearing, shell, supporting beam and hydraulic cylinders are provided on opposite sides of said roller stock.

12. A backing device as claimed in claim 6, wherein said pockets form a pair of rows on the internal surface of said shell.

* * * * *